Apr. 17, 1923.

E. J. ARMSTRONG 1,451,803

LOCKING DEVICE FOR POWER SHOVELS AND THE LIKE

Filed Aug. 29, 1921    2 Sheets-Sheet 1

Edwin J. Armstrong
Inventor
By W. Lind
Attorney

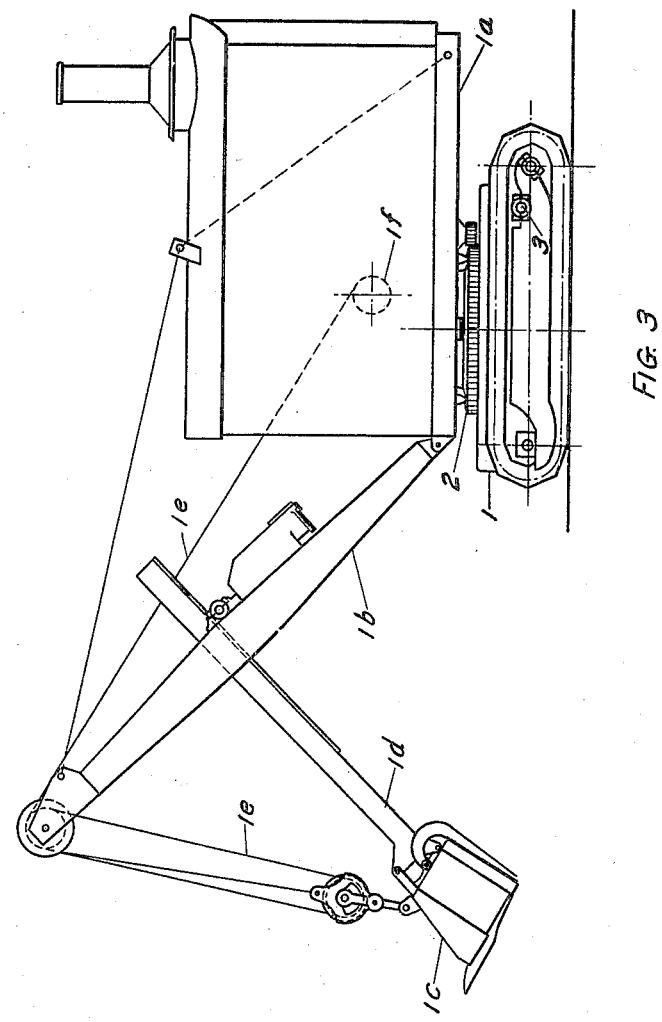

Patented Apr. 17, 1923.

1,451,803

UNITED STATES PATENT OFFICE.

EDWIN J. ARMSTRONG, OF ERIE, PENNSYLVANIA, ASSIGNOR OF ONE-HALF TO ARTHUR C. VICARY, OF ERIE, PENNSYLVANIA.

LOCKING DEVICE FOR POWER SHOVELS AND THE LIKE.

Application filed August 29, 1921. Serial No. 496,474.

*To all whom it may concern:*

Be it known that I, EDWIN J. ARMSTRONG, a citizen of the United States, residing at Erie, in the county of Erie and State of Pennsylvania, have invented new and useful Improvements in a Locking Device for Power Shovels and the like, of which the following is a specification.

This invention is designed to lock the supporting mechanism of a steam shovel so that when it is moved up to its work it may be locked against a rearward movement, thus saving the usual blocking to hold the shovel in this position. It is particularly applicable to a shovel provided with caterpillar tracks because the extended track gives such an engagement as to assure the locking of the shovel in place by locking the driving mechanism. Preferably the locking mechanism is such that the shovel is free to move forward so that it may be advanced into the work or advanced to take up whatever slippage there may be due to the thrust of the shovel.

The invention is illustrated in the accompanying drawings as follows:—

Figure 1:
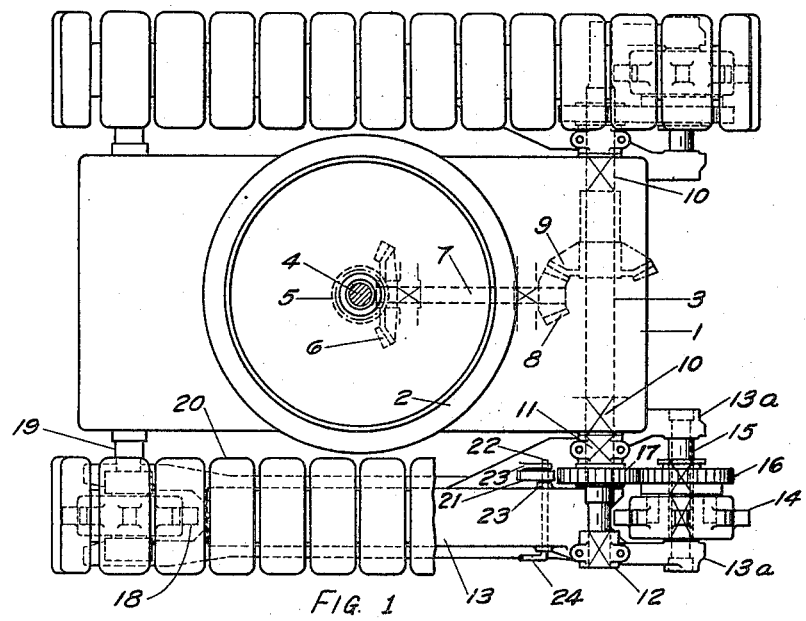

Fig. 1 shows a plan view of the frame and driving parts.

Figure 2:
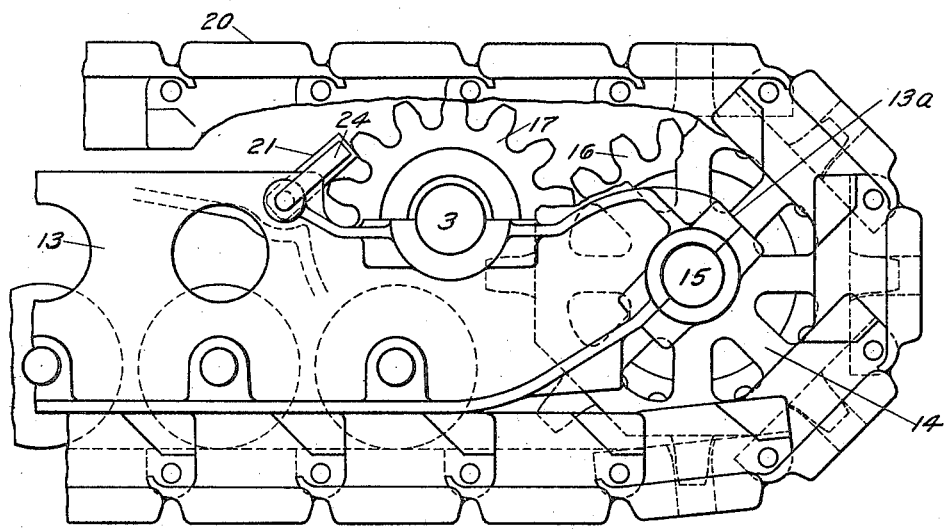

Fig. 2 a side elevation of the rear portion of the caterpillar track showing the locking device.

Fig. 3 a side elevation in outline of the shovel.

1 marks the shovel frame, 1ª the turn table thereon, operating on the usual guide-way 2, 1ᵇ the usual boom extending from the shovel, 1ᶜ the shovel carried by the usual dipper stick 1ᵈ, 1ᵉ a cable running from the shovel to the drum 1ᶠ and thus operating the shovel in the usual manner. It will readily be seen that as the shovel is thrust into the work it tends to force the power shovel as a whole to the rear and difficulty is experienced in maintaining the shovel in place. 3 marks the driving axle. This is driven in the usual manner from a central shaft 4 extending up through the turn table with power on the turn table, and 5 a gear below the table meshing with a gear 6, the gear 6 being fixed on the shaft 7. A gear 8 is fixed on the shaft 7 meshing with a gear 9 on the axle 3. The axle 3 is journaled in the usual bearings 10 in the frame.

The axle extends through bearings 11 and 12 on a caterpillar frame 13. A drive sprocket 14 is mounted on a shaft 15, the shaft being carried by the projections 13ª on the caterpillar carrier. A gear 16 is fixed with the sprocket 14 and driven from a gear 17 fixed on the axle 3. A front sprocket 18 is journaled on the front axle 19 and the caterpillar track 20 runs from the sprocket 14 to the sprocket 18, being driven by the sprocket 14 in the usual manner.

A pawl 21 is mounted on a shaft 22 extending through the caterpillar carrier 13 and journaled in bearings 23—23 on the carrier. The outer end of the shaft has an arm 24 and the pawl 21 is fixed on the shaft so that the pawl may be swung into position to engage the teeth of the gear 17 or removed from such position by means of the handle 24. The handle 24 and pawl of their own weight tend to hold the pawl in engagement with the teeth so as to operate as a ratchet. As the shovel is moved forward the pawl drops in behind the teeth as they are advanced locking the mechanism against a rearward movement. When it is desired to move the shovel to the rear all that is necessary is to throw the handle 24 over the carrier and with it the pawl and the weight of the pawl and handle hold them in their released position.

What I claim as new is:—

1. In a locking device for power shovels and the like, the combination of a frame; a driving axle on the frame; a driving wheel; and a releasable lock locking the wheel and preventing a rearward movement of the wheel.

2. In a locking device for power shovels and the like, the combination of a frame; a driving axle mounted on the frame; a driving wheel; a caterpillar track actuated by the driving wheel; and a releasable lock locking the wheel and preventing a rearward movement of the driving wheel.

3. In a locking device for power shovels and the like, the combination of a frame; a driving axle on the frame; a driving wheel; and a releasable lock locking the wheel and preventing a rearward movement of the wheel, said locking permitting a forward movement of the wheel.

4. In a locking device for power shovels and the like, the combination of a frame; a driving axle mounted in the frame; a driving wheel receiving its movement from the driving axle; a toothed wheel connected with the driving wheel, and a pawl acting on the toothed wheel to prevent a rearward movement of the driving wheel.

5. In a locking device for power shovels and the like, the combination of a frame; a driving axle mounted on the frame; a driving wheel; a gear on the driving axle; a gear connected with the driving wheel meshing with the gear on the driving axle; a pawl acting on 'one of the gears and acting as a ratchet to prevent a rearward movement of said gears; and a caterpillar track actuated by the wheel.

6. In a locking device for power shovels and the like, the combination of a frame; a driving axle mounted on the frame; a driving wheel; a gear on the driving axle; a gear connected with the driving wheel meshing with the gear on the driving axle; a pawl acting on the gear on the axle preventing a rearward movement of said gear; and a caterpillar track actuated by the wheel.

In testimony whereof I have hereunto set my hand.

EDWIN J. ARMSTRONG.